United States Patent [19]

Nickerson

[11] Patent Number: 5,778,097
[45] Date of Patent: Jul. 7, 1998

[54] TABLE-DRIVEN BI-DIRECTIONAL MOTION ESTIMATION USING SCRATCH AREA AND OFFSET VALVES

[75] Inventor: Brian R. Nickerson, Aloha, Oreg.

[73] Assignee: Intel Corporation, Santa Clara, Calif.

[21] Appl. No.: 610,582

[22] Filed: Mar. 7, 1996

[51] Int. Cl.$^6$ .................. G06K 9/36; G06K 9/46
[52] U.S. Cl. ............ 382/236; 348/394; 348/407; 348/413; 382/238
[58] Field of Search .................... 382/107, 236, 382/238; 348/409, 410, 411, 412, 413, 414, 415–416, 394

[56] References Cited

U.S. PATENT DOCUMENTS

| | | | |
|---|---|---|---|
| 5,144,423 | 9/1992 | Knauer et al. | 358/133 |
| 5,461,679 | 10/1995 | Normile et al | 382/304 |
| 5,475,430 | 12/1995 | Hamada et al. . | |
| 5,565,922 | 10/1996 | Krause | 348/413 |
| 5,608,458 | 3/1997 | Chen et al. . | |
| 5,619,256 | 4/1997 | Haskell et al. | 348/43 |
| 5,654,761 | 8/1997 | Jung | 348/416 |
| 5,657,416 | 8/1997 | Boon | 386/109 |

*Primary Examiner*—Joseph Mancuso
*Assistant Examiner*—Jayanti K. Patel
*Attorney, Agent, or Firm*—N. Stephen Kinsella, Esq.; William H. Murray, Esq.

[57] ABSTRACT

A prediction block is generated using a first region of a first reference frame and a second region of a second reference frame. A current block of a current frame is compared to the prediction block, where the comparison is based on a set of match points from the current block and a corresponding set of match points from the prediction block. The current block is processed based on the comparison of the current block to the prediction block. For each match point of the prediction block, a table index is generated from a pixel of the first region and either a pixel of the second region or an offset value, and a corresponding entry is retrieved from a lookup table using the table index. The comparison of the current block to the prediction block is based on the lookup-table entries for the prediction block. In a preferred embodiment, prediction blocks are generated for motion-estimation processing for bi-directionally predicted (B) frames of certain video encoding standards such as the H.263 standard.

28 Claims, 7 Drawing Sheets

FIG. 2. DECODING SYSTEM

FIG. 3
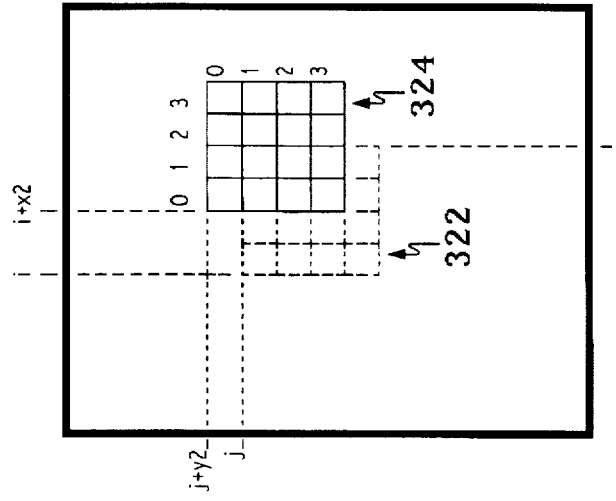
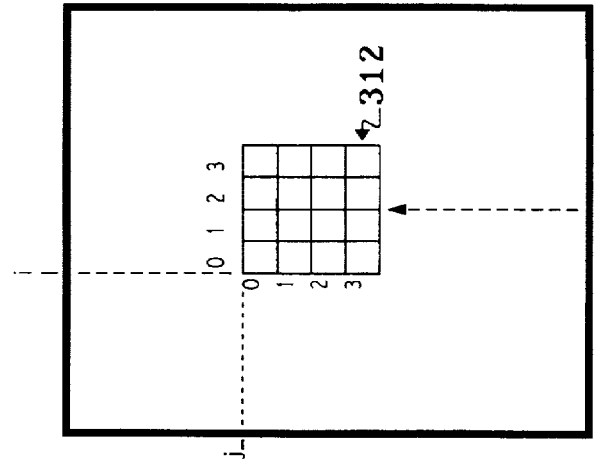
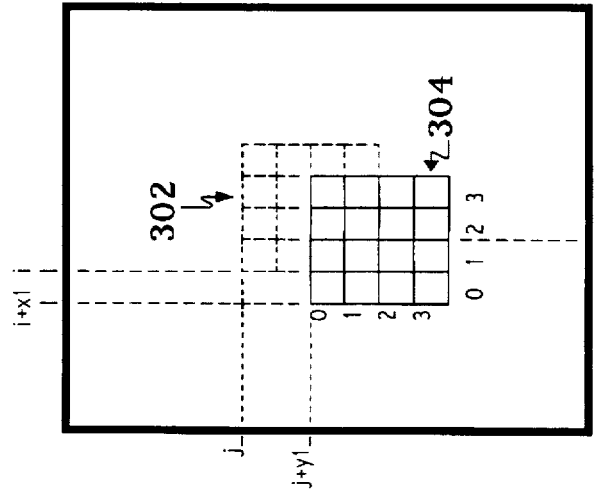

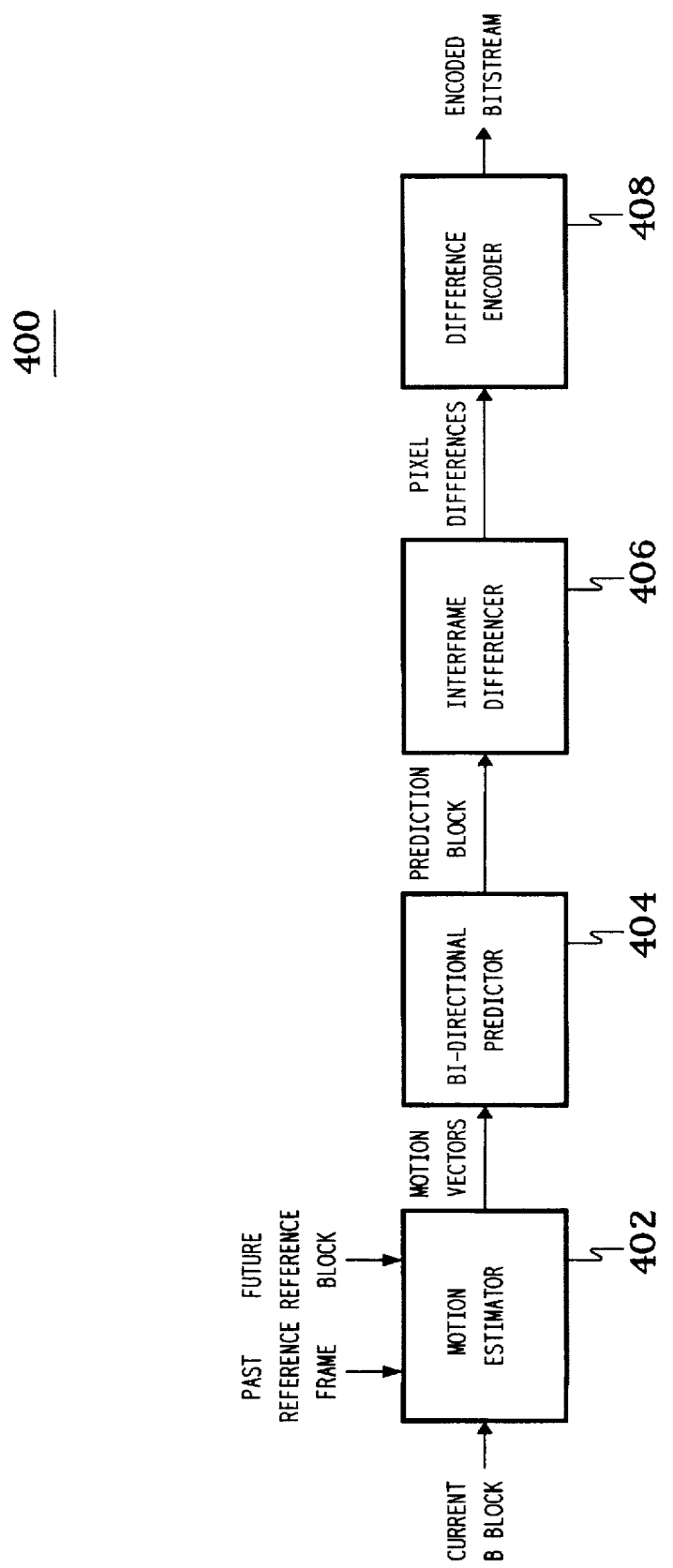
FIG. 4. VIDEO ENCODER

FIG. 5.  MOTION ESTIMATION
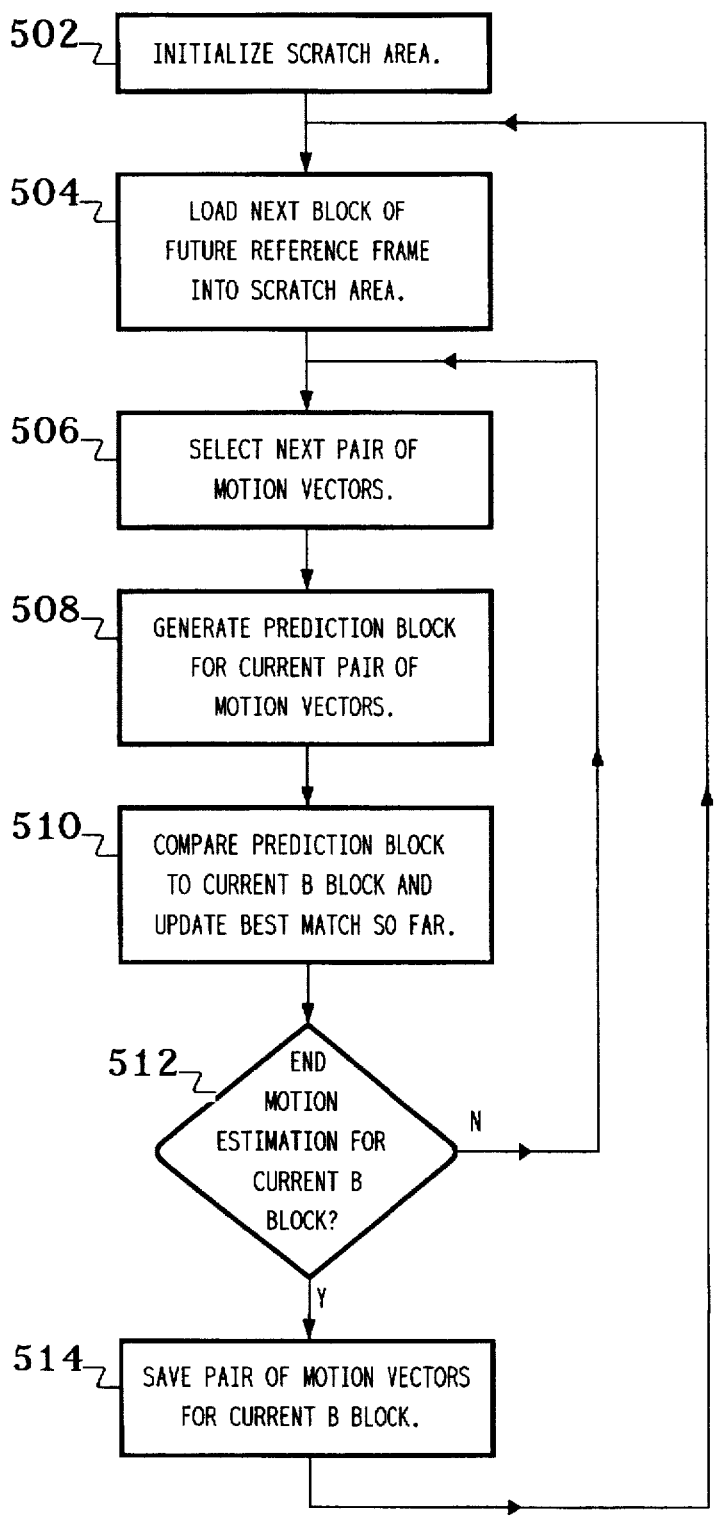

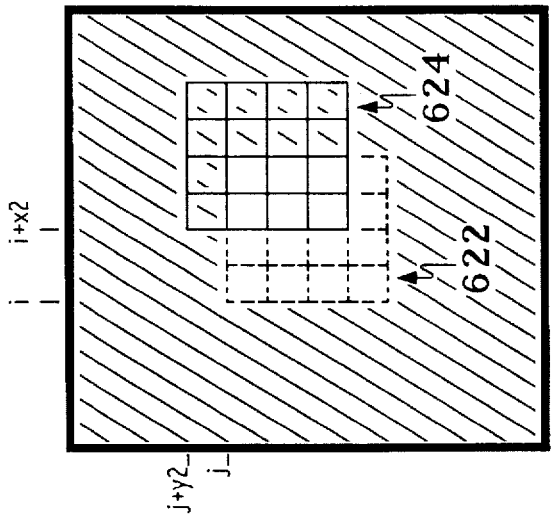
FIG. 6C SCRATCH AREA 600 WITH MOTION COMP
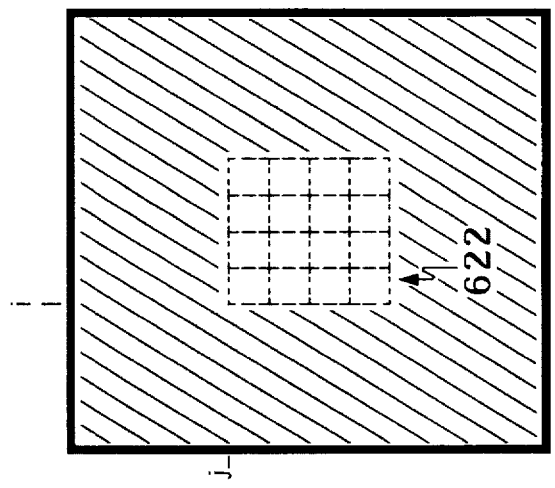
FIG. 6B SCRATCH AREA 600 WITH CORR. BLOCK
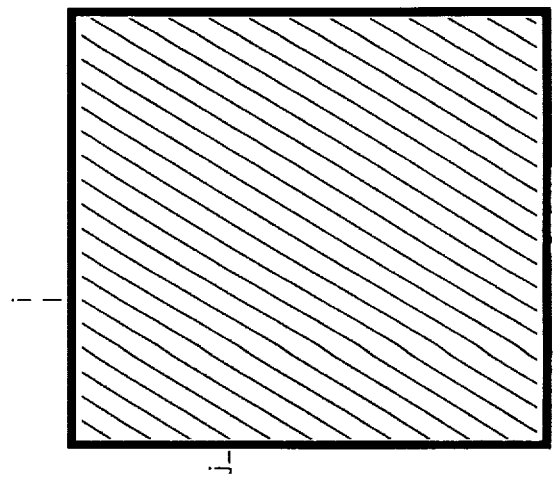
FIG. 6A SCRATCH AREA 600

FIG. 7. BI-DIRECTIONAL PREDICTION
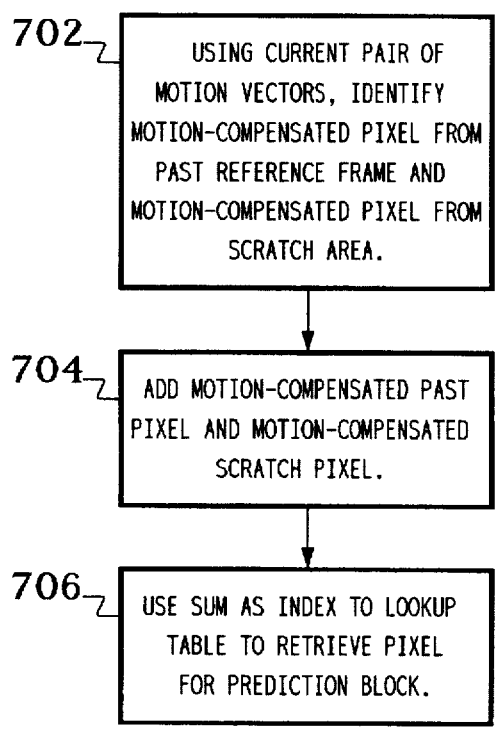

TABLE-DRIVEN BI-DIRECTIONAL MOTION ESTIMATION USING SCRATCH AREA AND OFFSET VALVES

BACKGROUND OF THE INVENTION

1. Field of the Invention

The present invention relates to video processing, and, in particular, to motion estimation.

2. Description of the Related Art

Several different video encoding schemes provide for bi-directionally predicted frames (also called B frames). A bi-directionally predicted frame is one that is inter-frame encoded with respect to two different reference frames: a past reference frame and a future reference frame. Under some of these video encoding schemes, each block of a B frame is encoded with respect to a prediction block, which is derived from a motion-compensated block of the past reference frame and a motion-compensated block of the future reference frame. According to certain of these video encoding schemes, some pixels of the prediction block may be based on both the past and future motion-compensated blocks, while other pixels of the same prediction block are based on only the past motion-compensated block.

During motion estimation processing in which the motion-compensated blocks of the past and future reference frames are identified, many different combinations of past and future reference blocks may be analyzed until the "best" blocks are found (i.e., the blocks that yield the prediction block that most closely matches the current block of the B frame). In traditional video encoding systems, each time a different future reference block is tested during motion estimation, logic is implemented to determine which pixels of the prediction block are to be generated from both the past and future reference blocks and which are to be generated from only the past reference block.

Such computationally expensive motion-estimation processing has traditionally been implemented by specially designed digital signal processing (DSP) chips, such as application specific integrated circuits (ASICs) that were designed to perform the specific functions very quickly. The DSP chips are designed to provide the required processing throughput. Recently, more and more video processing which was traditionally implemented in "hardware" such as ASICs has been shifted to being implemented in "software" on general-purpose processors. What is needed are motion-estimation algorithms that can be efficiently implemented on general-purpose processors that are not designed for a specific narrow set of tasks.

Further objects and advantages of this invention will become apparent from the detailed description of a preferred embodiment which follows.

SUMMARY OF THE INVENTION

The present invention comprises a method, an apparatus, and a storage medium encoded with machine-readable computer program code for processing video signals. According to a preferred embodiment, a prediction block is generated using a first region of a first reference frame and a second region of a second reference frame. A current block of a current frame is compared to the prediction block, wherein the comparison is based on a set of match points from the current block and a corresponding set of match points from the prediction block. The current block is processed based on the comparison of the current block to the prediction block. For each match point of the prediction block, a table index is generated from a pixel of the first region and either a pixel of the second region or an offset value, and a corresponding entry is retrieved from a lookup table using the table index. The comparison of the current block to the prediction block is based on the lookup-table entries for the prediction block.

BRIEF DESCRIPTION OF THE DRAWINGS

Other objects, features, and advantages of the present invention will become more fully apparent from the following detailed description of the preferred embodiment, the appended claims, and the accompanying drawings in which:

FIG. 3 is a representation of the H.263 bi-directional prediction rule, as applied for purposes of illustration to (4×4) blocks;

FIG. 4 is a block diagram of a video encoder, according to a preferred embodiment of the present invention;

FIG. 5 is a flow diagram of the motion-estimation processing implemented for a B frame by the motion estimator of the video encoder of FIG. 4;

FIGS. 6A–C are graphical representations of a scratch area, the scratch area loaded with a non-motion-compensated future block, and the scratch area loaded with the non-motion-compensated future block and showing the position of a motion-compensated future block; and FIG. 7 is a flow diagram of the processing implemented by the motion estimator of FIG. 4 to generate each pixel of the prediction block for each pair of motion vectors tested during motion-estimation processing.

DESCRIPTION OF THE PREFERRED EMBODIMENT(S)

Figure 1:
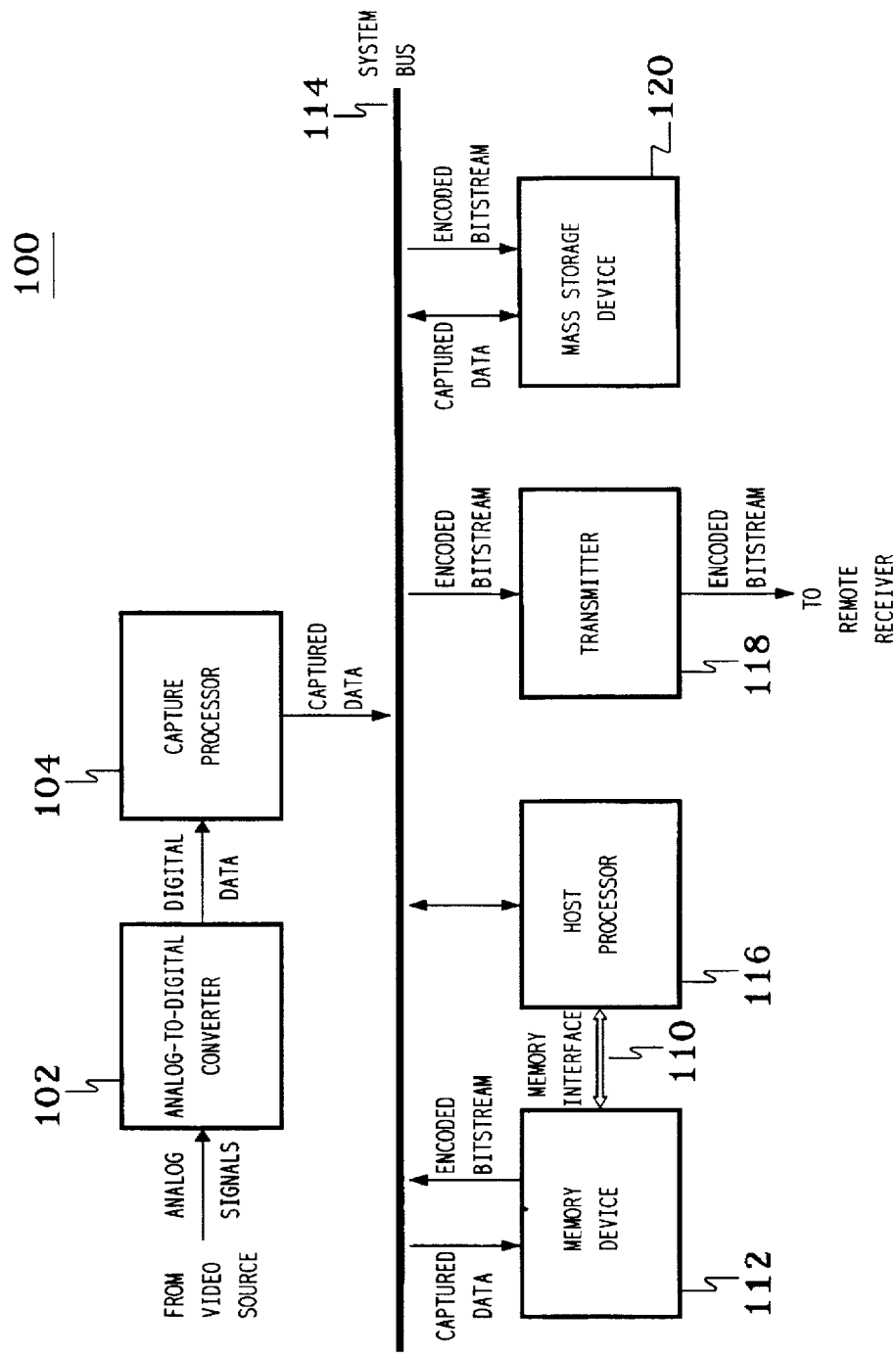
FIG. 1 is a block diagram of a video system for encoding video signals in a personal computer (PC) environment, according to a preferred embodiment of the present invention.

The present invention is directed to an efficient method for performing motion-estimation processing on general-purpose processors for bi-directional prediction under certain video encoding schemes.

For example, under the H.263 video standard promulgated by the International Telecommunication Union, (ITU), each block of a B frame is differentially encoded with respect to a prediction block. The prediction block is generated from a motion-compensated block of a past reference frame and a motion-compensated block of a future reference frame. Each pixel of the prediction block is either (1) the average of the corresponding motion-compensated pixel of the past reference frame and the corresponding motion-compensated pixel of the future reference frame or (2) equal to the corresponding motion-compensated pixel of the past reference frame. Those skilled in the art will understand that a "motion-compensated pixel" is a pixel of a motion-compensated block of a reference frame.

The determination of how to generate a pixel of the prediction block depends on the location of the future motion-compensated reference pixel relative to the corresponding non-motion-compensated block in the future reference frame. If the future motion-compensated reference pixel is within the corresponding non-motion-compensated block of the future reference frame, then the corresponding pixel of the prediction block is the average of the past and future motion-compensated reference pixels.

If, on the other hand, the future motion-compensated reference pixel is outside of the corresponding non-motion-compensated motion-compensated block of the future reference frame, then the corresponding pixel of the prediction block is equal to the past motion-compensated reference pixel. Those skilled in the art will understand that this bi-directional prediction rule of the H.263 video standard is based on the assumption that only the corresponding non-motion-compensated block of the future reference frame is available during the decoding of each block of the B frame. In conventional video processing systems, the determination of how to generate a pixel of the prediction block was implemented in a DSP chip using explicit logical tests of the location of the pixels of the future motion-compensated reference pixels relative to the corresponding non-motion-compensated block of the future reference frame.

Referring now to FIG. 3, there is shown a representation of the H.263 bi-directional prediction rule as applied for purposes of illustration to (4×4) blocks. FIG. 3 shows (4×4) block 312 of B frame 310, which is to be interframe encoded with respect to prediction block 330. Prediction block 330 is generated from motion-compensated block 304 of past reference frame 300 and motion-compensated block 324 of future reference frame 320. Motion-compensated blocks 304 and 324 are the blocks of the past and future reference frames identified during motion estimation processing as providing the best prediction of block 312 of B frame 310. Block 302 is the non-motion-compensated block of past reference frame 300 corresponding to block 312 of B frame 310. Similarly, block 322 is the non-motion-compensated block of future reference frame 320 corresponding to block 312. That is, blocks 302 and 322 have the same position in their respective frames as block 312 has in B frame 310 (i.e., with the upper left corner at coordinates (i,j)).

According to the H.263 bi-directional prediction rule, the pixels of prediction block 330 are generated as follows. If a particular pixel of future motion-compensated reference block 324 is within 5 non-motion-compensated block 322, then the corresponding pixel of prediction block 330 is the average of the corresponding motion-compensated pixel of past reference block 304 and the motion-compensated pixel of future reference block 324. If, on the other hand, a particular pixel of future motion-compensated reference block 324 is outside of non-motion-compensated block 322, then the corresponding pixel of prediction block 330 is equal to the corresponding motion-compensated pixel of past reference block 304.

In the example of FIG. 3, pixel (1,1) of future reference block 324 is within non-motion-compensated block 322. Pixel (1,1) of prediction block 330 is therefore the average of pixel (1,1) of past reference block 304 and pixel (1,1) of future reference block 324. On the other hand, pixel (2,3) of future reference block 324 is outside of non-motion-compensated block 322. Pixel (2,3) of prediction 15 block 330 is therefore equal to pixel (2,3) of past reference block 304. Again, those skilled in the art will understand that pixel (2,3) of prediction block 330 is based only on pixel (2,3) of past reference block 304, because the assumption under the H.263 standard is that pixel (2,3) of future reference block 324 (and all the other pixels of block 324 that are outside of block 322) will not be available at the time that block 312 of B frame 310 is being decoded.

According to one embodiment of the present invention, motion-estimation processing (which identifies the motion-compensated blocks of the past and future reference frames used to generate the prediction block) is implemented in software running on a general-purpose host processor of a video encoding system, such as is described in the following section.

System Hardware Architectures

Referring now to FIG. 1, there is shown a computer system 100 for encoding video signals, according to a preferred embodiment of the present invention. Analog-to-digital (A/D) converter 102 of encoding system 100 receives analog video signals from a video source. The video source may be any suitable source of analog video signals such as a video camera or VCR for generating local analog video signals or a video cable or antenna for receiving analog video signals from a remote source. A/D converter 102 separates the analog video signal into constituent components and digitizes the analog components into digital video component data (e.g., in one embodiment, 24-bit RGB component data).

Capture processor 104 captures the digital 3-component video data received from converter 102. Capturing may include one or more of color conversion (e.g., RGB to YUV), scaling, and subsampling. Each captured video frame is represented by a set of three two-dimensional component planes, one for each component of the digital video data. In one embodiment, capture processor 104 captures video data a YUV9 (i.e., YUV 4:1:1) format, in which every (4×4) block of pixels of the Y-component plane corresponds to a single pixel in the U-component plane and a single pixel in the V-component plane. Capture processor 104 selectively stores the captured data to memory device 112 and/or mass storage device 120 via system bus 114. Those skilled in the art will understand that, for real-time encoding, the captured data are preferably stored to memory device 112, while for non-real-time encoding, the captured data are preferably stored to mass storage device 120. For non-real-time encoding, the captured data will subsequently be retrieved from mass storage device 120 and stored in memory device 112 for encode processing by host processor 116.

During encoding, host processor 116 reads the captured bitmaps from memory device 112 via high-speed memory interface 110 and generates an encoded video bitstream that represents the captured video data and conforms to the H.263 standard. The resulting encoded video bitstream is then stored to memory device 112 via memory interface 110. Host processor 116 may copy the encoded video bitstream to mass storage device 120 for future playback and/or transmit the encoded video bitstream to transmitter 118 for real-time transmission to a remote receiver (not shown in FIG. 1).

Figure 2:
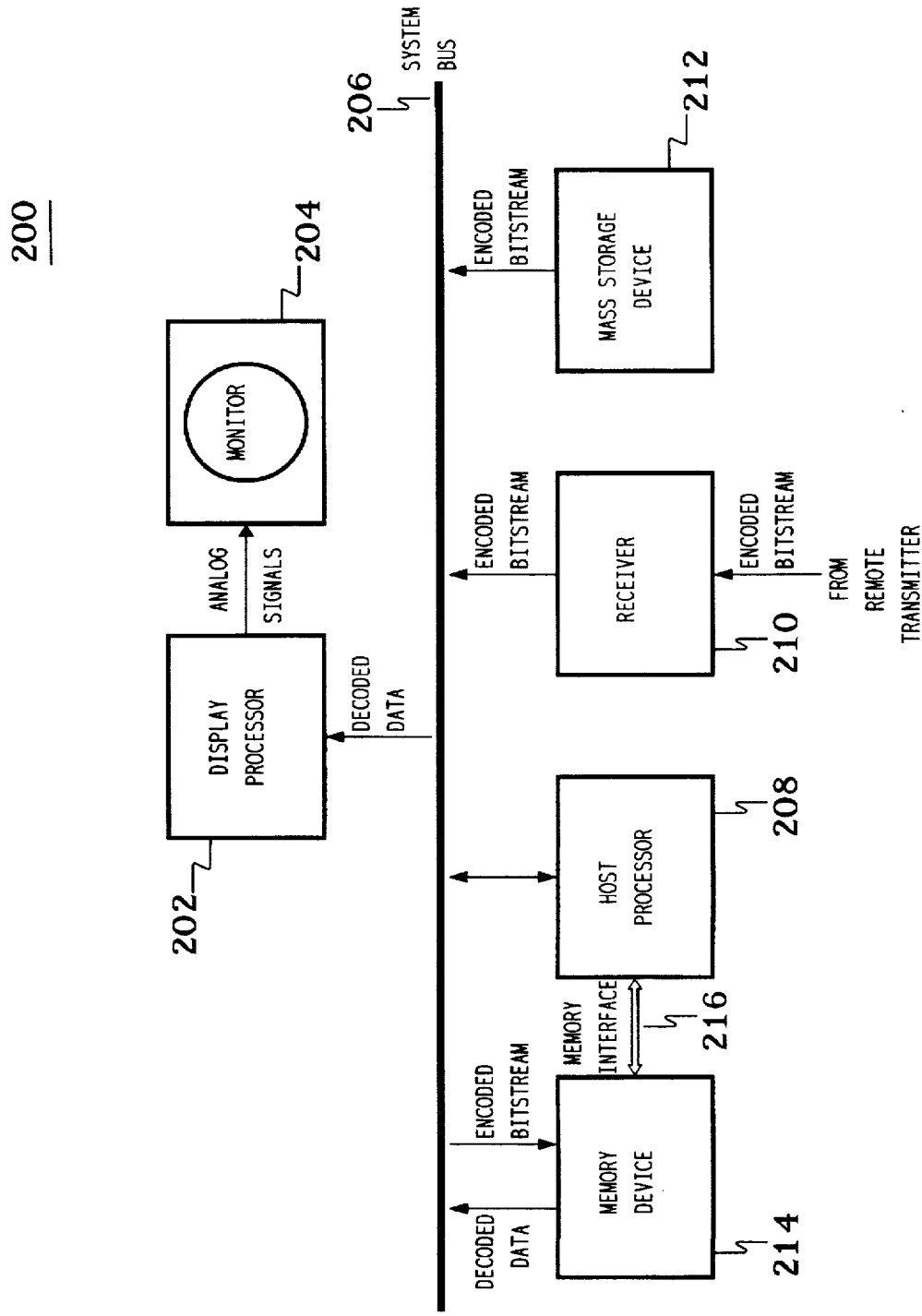
FIG. 2 is a computer system for decoding the video signals encoded by the computer system of FIG. 1, according to a preferred embodiment of the present invention.

Referring now to FIG. 2, there is shown a computer system 200 for decoding the encoded H.263 video bitstream encoded by encoding (system 100 of FIG. 1, according to a preferred embodiment of the present invention. The encoded video bitstream is either read from mass storage device 212 of decoding system 200 or received by receiver 210 from a remote transmitter, such as transmitter 118 of FIG. 1. The encoded video bitstream is stored to memory device 214 via system bus 206.

Host processor 208 accesses the encoded video bitstream stored in memory device 214 via high-speed memory interface 216 and decodes the encoded video bitstream for display. Decoding the encoded video bitstream involves undoing the compression processing implemented by encoding system 100 of FIG. 1. Host processor 208 stores the resulting decoded video data to memory device 214 via memory interface 216 from where the decoded video data are transmitted to display processor 202 via system bus 206. Alternatively, host processor 208 transmits the decoded video data directly to display processor 202 via system bus 206. Display processor 202 processes the decoded video data for display on monitor 204. The processing of display processor 202 includes digital-to-analog conversion of the decoded video data. After being decoded by host processor 208 but before being D/A converted by display processor 202, the decoded video data may be upsampled (e.g., from YUV9 to YUV24), scaled, and/or color converted (e.g., from YUV24 to RGB24). Depending upon the particular embodiment, each of these processing steps may be implemented by either host processor 208 or display processor 202.

Referring again to FIG. 1, encoding system 100 is preferably a microprocessor-based personal computer (PC) system with a special purpose video-processing plug-in board. In particular, A/D converter 102 may be any suitable means for decoding and digitizing analog video signals. Capture processor 104 may be any suitable processor for capturing digital video component data as subsampled frames. In a preferred embodiment, A/D converter 102 and capture processor 104 are contained in a single plug-in board capable of being added to a microprocessor-based PC system.

Host processor 116 may be any suitable means for controlling the operations of the specialpurpose video processing board and for performing video encoding. Host processor 116 is preferably a general-purpose microprocessor manufactured by Intel Corporation, such as an i486™, Pentium®, or Pentium® Pro processor. System bus 114 may be any suitable digital signal transfer device and is preferably a peripheral component interconnect (PCI) bus. Memory device 112 may be any suitable computer memory device and is preferably one or more dynamic random access memory (DRAM) devices. High-speed memory interface 110 may be any suitable means for interfacing between memory device 112 and host processor 116. Mass storage device 120 may be any suitable means for storing digital data and is preferably a computer hard drive. Transmitter 118 may be any suitable means for transmitting digital data to a remote receiver. Those skilled in the art will understand that the encoded video bitstream may be transmitted using any suitable means of transmission such as telephone line, RF antenna, local area network, or wide area network.

Referring again to FIG. 2, decoding system 200 is preferably a microprocessor-based PC system similar to the basic PC system of encoding system 100. In particular, host processor 208 may be any suitable means for decoding an encoded video bitstream and is preferably a general purpose microprocessor manufactured by Intel Corporation, such as an i486™, Pentium®, or Pentium® Pro processor. System bus 206 may be any suitable digital data transfer device and is preferably a PCI bus. Mass storage device 212 may be any suitable means for storing digital data and is preferably a CD-ROM device or a hard drive. Receiver 210 may be any suitable means for receiving the digital data transmitted by transmitter 118 of encoding system 100. Display processor 202 and monitor 204 may be any suitable devices for processing and displaying video images (including the conversion of digital video data to analog video signals) and are preferably parts of a PC-based display system having a PCI graphics board and a 24-bit RGB monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video images. Those skilled in the art will understand that such a combined system may be used to display decoded video images in real-time to monitor the capture and encoding of video stream.

In alternative embodiments of present invention, the video encode processing of an encoding system and/or the video decode processing of a decoding system may be assisted by a pixel processor or other suitable component(s) to off-load processing from the host processor by performing computationally intensive operations.

Software Architecture

Referring now to FIG. 4, there is shown a block diagram of video encoder 400, according to a preferred embodiment of the present invention. Video encoder 400 is preferably implemented in software on host processor 116 of encoding system 100 of FIG. 1. As shown in FIG. 4 and consistent with the H.263 standard, video encoder 400 encodes each block of a B frame based on a past reference frame and the corresponding non-motion-compensated block of a future reference frame.

In particular, motion estimator 402 relies on the past reference frame and the corresponding future reference block to perform motion-estimation processing to generate a pair of motion vectors for each block of the B frame: one motion vector relating the current B block to the past reference frame and one motion vector relating the current B block to the future reference frame. For each block in the B frame, bi-directional predictor 404 uses the corresponding pair of motion vectors to perform motion compensation to generate a prediction block. Interframe differencer 406 uses the prediction block to generate the interframe differences between the current B block and the prediction block, which are further encoded by difference encoder 408 to generate the portion of the encoded H.263 bitstream for the current B block. Those skilled in the art will understand that difference encoder 408 performs all of the steps appropriate, under the H.263 standard, to transform the pixel differences into encoded data for the H.263 bitstream.

Motion Estimation Processing

Referring now to FIG. 5, there is shown a flow diagram of the motion-estimation processing implemented for a B frame by motion estimator 402 of video encoder 400 of FIG. 4, according to a preferred embodiment of the present invention. Motion estimator 402 uses a scratch area of memory and a special lookup table to perform efficient motion-estimation processing under the H.263 prediction rule described earlier in this specification in conjunction with FIG. 3.

Referring now to FIGS. 6A–C, there are shown graphical representations, respectively, of scratch area 600, scratch area 600 loaded with future reference pixels into region 622, and scratch area 600 loaded with pixels in region 622 and showing the position of region 624. Referring again to FIG. 3, region 622 of FIGS. 6B and 6C is loaded with pixels from non-motion compensated block 322 of future reference frame 320 which corresponds to the current block 312 of B frame 310. Region 624 of FIG. 6C corresponds to the position of motion-compensated block 324 of future reference frame 320. As described earlier, only those pixels of motion-compensated block 324 that fall within non-motion-compensated block 322 are available for use in generating a prediction block for current B block 312. Scratch area 600 is preferably the size of the search region for motion estimation. For example, if motion estimation processing has an upper limit of ±4 pixels in any direction, then scratch area 600 is preferably a (12×12) area to accommodate all possible motion of the (4×4) blocks.

Referring again to FIG. 5, motion estimation for the current B frame begins with motion estimator 402 of FIG. 4 initializing the scratch area (step 502 of FIG. 5). As represented in FIG. 6A, this initialization involves loading an offset value into each "pixel" of the scratch area 600, where areas having offset-value pixels are indicated in shading in FIGS. 6A–C. According to a preferred embodiment in which the image pixels are 7-bit values, the offset value is 255. For each block of the current B frame, motion estimator 402 loads the corresponding non-motion-compensated block of the future reference frame into the center of scratch area 600 (step 504 and FIG. 6B). For example, for block 312 of B frame 310 of FIG. 3, motion estimator 402 loads the pixels of non-motion-compensated block 322 of the future reference frame 320 into region 622 of scratch area 600. Assuming 7-bit image pixels, the values loaded into region 622 of the scratch area 600 will range from 0 to 127, while the values loaded into the shaded border areas will remain at 255.

The goal of motion estimation is to find the best prediction for the current B block. To achieve that goal, during motion estimation, different pairs of motion vectors are tested to determine which motion vector pair provides the best prediction, where one motion vector defines the relationship between the current B block and the past reference frame and the other motion vector defines the relationship between the current B block and the future reference frame. The sequence of selecting different pairs of motion vectors is controlled by step 506, which selects the next pair of motion vectors, and step 512, which determines whether motion estimation processing for the current B block is complete. Those skilled in the art will understand that the selection of motion vector pairs may follow any of a variety of schemes, including without limitation exhaustive searches through specified ranges of motion, and logarithmic searches. In addition, step 512 may include "escape logic" which allows motion estimation processing to terminate before all of the possible motion-vector pairs are tested when a prediction block is found which is "good enough."

After the current pair of motion vectors is selected in step 506, the prediction block defined by those two motion vectors is generated following the H.263 prediction rule (step 508). The prediction block is then compared to the current B block to see if this prediction block is the best match so far (applying suitable comparison criteria such as sum of absolute differences or sum of squared differences) (step 510). When motion-estimation processing for the current B block is complete (step 512), the pair of motion vectors corresponding to the best match is saved for use in encoding the current B block (step 514). When motion-estimation processing continues to the next B block, the values for the corresponding non-motion-compensated block of the future reference frame are loaded into the center of the scratch area overwriting region 622 with new pixel values, without having to re-initialize the scratch area to the offset value.

Bi-Directional Prediction

Referring now to FIG. 7, there is shown a flow diagram of the processing implemented by motion estimator 402 of FIG. 4 to generate each pixel of the prediction block for each pair of motion vectors tested during motion-estimation processing. The pair of motion vectors are used to identify two motion-compensated pixels: a motion-compensated pixel from the past reference frame (i.e., a pixel from motion-compensated block 304 of frame 300 of FIG. 3) and a motion-compensated pixel from scratch area 600 of FIG. 6C (i.e., a pixel from motion-compensated region 624 of FIG. 6C) (step 702 of FIG. 7). The motion-compensated past pixel and the motion-compensated scratch pixel are added together (step 704) and the resulting sum is used as an index to a special lookup table that maps to the appropriate value for the prediction block (step 706).

As shown in FIG. 6C, if a pixel of motion-compensated region 624 falls within region 622, then the scratch pixel will correspond to one of the pixels from the non-motion-compensated block of the future reference frame corresponding to the current B block. In that case, the scratch pixel will have a value from 0 to 127. If, however, the motion-compensated scratch pixel falls outside of region 622 of FIG. B, then the scratch pixel will have a value of 255 (i.e., the offset value to which the scratch area was initialized). Thus, if the scratch pixel is within region 622, then the sum of the past pixel (ranging from 0 to 127) and the scratch pixel (also ranging from 0 to 127) will range from 0 to 254. If, on the other hand, the scratch pixel is outside of region 622, then the sum of the past pixel (ranging from 0 to 127) and the scratch pixel (having a value of 255) will range from 255 to 382. As such, the set of possible values generated from a past pixel and a future pixel (i.e., 0 to 254) does not intersect (i.e., has no values in common with) the set of possible values generated from a past pixel and the offset value (i.e., 255 to 382).

The lookup table is designed such that, for indices from 0 to 254, the corresponding table entry is a number representative of the average of the past pixel and the scratch pixel (i.e., half of the index value), while, for indices from 255 to 382, the corresponding table entry is a number representative of only the past pixel (i.e., the index value minus 255). In a preferred embodiment, the lookup table actually maps to a value equal to −2 times the exact pixel values for the prediction block. This is done to facilitate subsequent processing in which a match value (e.g., sum of absolute differences) is generated for the prediction block relative to the current B block.

In this way, the table lookup operation can be used to eliminate explicit testing of whether the scratch pixel is inside or outside of the non-motion-compensated region 622. As a result, the motion-estimation processing can be more efficiently implemented on a general-purpose processor such as an Intel Pentium® processor.

Those skilled in the art will understand that the present invention can be extended to motion-estimation processing at half-pixel resolutions. In that case, future (and past) reference pixels may need to be generated using one- or two-dimensional interpolation before generating the prediction block. to the situation with whole-pixel resolution, under the H.263 standard, if any of the future reference pixels which would be required to generate an interpolated pixel lies outside of the non-motion-compensated region, then the corresponding pixel of the prediction block is to be based only on the pixels of the past reference frame. It will be understood that an interpolation lookup table could be designed to perform the necessary interpolation. If any of the pixels fall outside of the legal region, then the interpolation lookup table should map to the offset value 255 so that the next table lookup (into the prediction-block lookup table) will return the appropriate value corresponding only to the past reference pixel.

Alternative Embodiments

The present invention has been described in terms of motion-estimation processing based on (4×4) blocks of pixels. Those skilled in the art will understand that the present invention covers other block sizes such as (8×8) or (16×16) and even region shapes other than square. The comparisons implemented during motion-estimation processing between the current B block and each of the prediction blocks are based on a set of match points from each block. The set of match points may comprise all of the block pixels or the set may correspond to a subset of the pixels of the blocks. That is, the block comparison of the motion-estimation processing may be based on full-sampled blocks or subsampled blocks.

It will also be understood that the present invention applies to video encoding schemes other than the H.263 standard. In general, the restricted area in the future reference frame need not be limited to the corresponding non-motion-compensated block. For example, the restricted area in the future reference frame could correspond to that portion of the future frame decoded up to the current block following a raster scan sequence (e.g., all of the rows above the current block and all blocks to the left within the row of the current block).

Those skilled in the art will understand that the term "lookup table" in the context of the claimed invention refers generally to any mapping from input (i.e., "table index") to output (i.e., "entry").

The present invention has been described in the context of video encoding. Those skilled in the art will understand that the motion-estimation processing of the present invention may be implemented in other contexts, such as computer vision and other types of image processing.

The present invention can be embodied in the form of methods and apparatuses for practicing those methods. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for processing video signals, comprising the steps of:
   (a) generating a prediction block using a first region of a first reference frame and a second region of a second reference frame;
   (b) comparing a current block of a current frame to the prediction block, wherein the comparison is based on a set of match points from the current block and a corresponding set of match points from the prediction block; and
   (c) processing the current block based on the comparison of the current block to the prediction block, wherein:

step (a) comprises the steps of initializing a scratch area larger than the second region to an offset value and copying the second region into a second region portion of the scratch area, whereby the scratch area comprises pixels of the second region in the second region portion of the scratch area and offset values elsewhere in the scratch area;

for each match point of the prediction block, step (a) comprises the steps of:
   (1) generating a table index from a pixel of the first region and either a pixel of the second region or an offset value by adding a pixel of the first region and a pixel from the scratch area wherein the offset value is selected such that the set of possible values of table indices generated from the pixels of the first region and the pixels of the second region does not intersect the set of possible values of table indices generated from the pixels of the first region and the offset value;
   and
   (2) retrieving a corresponding entry from a lookup table using the table index,
      wherein:
         when the table index is based on a pixel of the first region and a pixel of the second region, the corresponding entry of the lookup table represents the average of the pixel of the first region and the pixel of the second region; and
         when the table index is based on a pixel of the first region and the offset value the corresponding entry of the lookup table represents only the pixel of the first region; and the comparison of the current block to the prediction block is based on the lookup-table entries for the prediction block.

2. The method of claim 1, wherein the scratch area is the size of a search region used in generating the prediction block in step (a).

3. The method of claim 1, wherein:
   the first reference frame is a past reference frame;
   the second reference frame is a future reference frame;
   the second region is a non-motion-compensated block of the future reference frame corresponding to the current block of the current frame.

4. The method of claim 1, wherein step (c) comprises the step of encoding the current block using motion-compensated interframe differencing.

5. The method of claim 4, wherein the encoding of the current block conforms to encoding of bi-directionally encoded frames for the H.263 video compression standard.

6. The method of claim 1, wherein the pixels of the first and second regions range from 0 to 127 and the offset value is 255.

7. The method of claim 1, wherein:
   the first reference frame is a past reference frame;
   the second reference frame is a future reference frame;
   the second region is a non-motion-compensated block of the future reference frame corresponding to the current block of the current frame;
   step (c) comprises the step of encoding the current block using motion-compensated interframe differencing conforming to encoding of bi-directionally encoded frames for the H.263 video compression standard; and
   the pixels of the first and second regions range from 0 to 127 and the offset value is 255.

8. An apparatus for processing video signals, comprising:

(a) means for generating a prediction block using a first region of a first reference frame and a second region of a second reference frame;

(b) means for comparing a current block of a current frame to the prediction block, wherein the comparison is based on a set of match points from the current block and a corresponding set of match points from the prediction block; and (c) means for processing the current block based on the comparison of the current block to the prediction block, wherein:

means (a) comprises means for initializing a scratch area larger than the second region to an offset value and for copying the second region into a second region portion of the scratch area, whereby the scratch area comprises pixels of the second region in the second region portion of the scratch area and offset values elsewhere in the scratch area;

for each match point of the prediction block, means (a):

(1) generates a table index from a pixel of the first region and either a pixel of the second region or an offset value by adding a pixel of the first region and a pixel from the scratch area, wherein the offset value is selected such that the set of possible values of table indices generated from the pixels of the first region and the pixels of the second region does not intersect the set of possible values of table indices generated from the pixels of the first region and the offset value; and (2) retrieves a corresponding entry from a lookup table using the table index.

wherein:

when the table index is based on a pixel of the first region and a pixel of the second region the corresponding entry of the lookup table represents the average of the pixel of the first region and the pixel of the second region, and when the table index is based on a pixel of the first region and the offset value, the corresponding entry of the lookup table represents only the pixel of the first region; and the comparison of the current block to the prediction block is based on the lookup-table entries for the prediction block.

9. The apparatus of claim 8, wherein the scratch area is the size of a search region used in generating the prediction block in step (a).

10. The apparatus of claim 8, wherein:

the first reference frame is a past reference frame;

the second reference frame is a future reference frame;

the second region is a non-motion-compensated block of the future reference frame corresponding to the current block of the current frame.

11. The apparatus of claim 8, wherein means (c) encodes the current block using motion-compensated interframe differencing.

12. The apparatus of claim 11, wherein the encoding of the current block conforms to encoding of bi-directionally encoded frames for the H.263 video compression standard.

13. The apparatus of claim 8, wherein the pixels of the first and second regions range from 0 to 127 and the offset value is 255.

14. The apparatus of claim 8, wherein:

the first reference frame is a past reference frame;

the second reference frame is a future reference frame;

the second region is a non-motion-compensated block of the future reference frame corresponding to the current block of the current frame;

means (c) encodes the current block using motion-compensated interframe differencing conforming to encoding of bi-directionally encoded frames for the H.263 video compression standard; the pixels of the first and second regions range from 0 to 127 and the offset value is 255.

15. A storage medium having stored thereon a plurality of instructions for processing video signals, wherein the plurality of instructions when executed by a processor cause the processor to perform the steps of:

(a) generating a prediction block using a first region of a first reference frame and a second region of a second reference frame;

(b) comparing a current block of a current frame to the prediction block, wherein the comparison is based on a set of match points from the current block and a corresponding set of match points from the prediction block; and (c) processing the current block based on the comparison of the current block to the prediction block, wherein:

step (a) comprises the steps of initializing a scratch area larger than the second region to an offset value and copying the second region into a second region portion of the scratch area whereby the scratch area comprises pixels of the second region in the second region portion of the scratch area and offset values elsewhere in the scratch area;

for each match point of the prediction block, step (a) comprises the steps of:

(1) generating a table index from a pixel of the first region and either a pixel of the second region or an offset value by adding a pixel of the first region and a pixel from the scratch area, wherein the offset value is selected such that the set of possible values of table indices generated from the pixels of the first region and the pixels of the second region does not intersect the set of possible values of table indices generated from the pixels of the first region and the offset value; and (2) retrieving a corresponding entry from a lookup table using the table index, wherein:

when the table index is based on a pixel of the first region and a pixel of the second region, the corresponding entry of the lookup table represents the average of the pixel of the first region and the pixel of the second region; and when the table index is based on a pixel of the first region and the offset value, the corresponding entry of the lookup table represents only the pixel of the first region; and the comparison of the current block to the prediction block is based on the lookup-table entries for the prediction block.

16. The storage medium of claim 15, wherein the scratch area is the size of a search region used in generating the prediction block in step (a).

17. The storage medium of claim 15, wherein:

the first reference frame is a past reference frame;

the second reference frame is a future reference frame;

the second region is a non-motion-compensated block of the future reference frame corresponding to the current block of the current frame.

18. The storage medium of claim 15, wherein step (c) comprises the step of encoding the current block using motion-compensated interframe differencing.

19. The storage medium of claim 18, wherein the encoding of the current block conforms to encoding of bi-directionally encoded frames for the H.263 video compression standard.

20. The storage medium of claim 15, wherein the pixels of the first and second regions range from 0 to 127 and the offset value is 255.

21. The storage medium of claim 15, wherein:

the first reference frame is a past reference frame;

the second reference frame is a future reference frame;

the second region is a non-motion-compensated block of the future reference frame corresponding to the current block of the current frame;

step (c) comprises the step of encoding the current block using motion-compensated interframe differencing conforming to encoding of bi-directionally encoded frames for the H.263 video compression standard; and the pixels of the first and second regions range from 0 to 127 and the offset value is 255.

22. An apparatus for processing video signals, comprising:

a prediction-block generator;

a block comparator; and a block processor, wherein: the prediction-block generator generates a prediction block using a first region of a first reference frame and a second region of a second reference frame;

the block comparator compares a current block of a current frame to the prediction block, wherein the comparison is based on a set of match points from the current block and a corresponding set of match points from the prediction block; and the block processor processes the current block based on the comparison of the current block to the prediction block, wherein:

the prediction-block generator initializes a scratch area larger than the second region to an offset value and copies the second region into a second region portion of the scratch area, whereby the scratch area comprises pixels of the second region in the second region portion of the scratch area and offset values elsewhere in the scratch area, for each match point of the prediction block, the prediction-block generator:

(1) generates a table index from a pixel of the first region and either a pixel of the second region or an offset value by adding a pixel of the first region and a pixel from the scratch area, wherein the offset value is selected such that the set of possible values of table indices generated from the pixels of the first region and the pixels of the second region does not intersect the set of possible values of table indices generated from the pixels of the first region and the offset value; and (2) retrieves a corresponding entry from a lookup table using the table index wherein:

when the table index is based on a pixel of the first region and a pixel of the second regions the corresponding entry of the lookup table represents the average of the pixel of the first region and the pixel of the second region: and when the table index is based on a pixel of the first region and the offset value, the corresponding entry of the lookup table represents only the pixel of the first region; and the comparison of the current block to the prediction block is based on the lookup-table entries for the prediction block.

23. The apparatus of claim 22, wherein the scratch area is the size of a search region used in generating the prediction block in step (a).

24. The apparatus of claim 22, wherein:

the first reference frame is a past reference frame;

the second reference frame is a future reference frame;

the second region is a non-motion-compensated block of the future reference frame corresponding to the current block of the current frame.

25. The apparatus of claim 22, wherein the block processor encodes the current block using motion-compensated interframe differencing.

26. The apparatus of claim 25, wherein the encoding of the current block conforms to encoding of bi-directionally encoded frames for the H.263 video compression standard.

27. The apparatus of claim 22, wherein the pixels of the first and second regions range from 0 to 127 and the offset value is 255.

28. The apparatus of claim 22, wherein:

the first reference frame is a past reference frame;

the second reference frame is a future reference frame;

the second region is a non-motion-compensated block of the future reference frame corresponding to the current block of the current frame;

the block processor encodes the current block using motion-compensated interframe differencing conforming to encoding of bi-directionally encoded frames for the H.263 video compression standard; and the pixels of the first and second regions range from 0 to 127 and the offset value is 255.

* * * * *